Oct. 11, 1966      A. K. BEY      3,277,681

DUAL KEY RING INCLUDING MAGNETIC FASTENER

Filed May 11, 1965

INVENTOR
AHMET K. BEY by: Wolfe, Hubbard, Voit & Osann
ATTYS.

United States Patent Office 3,277,681
Patented Oct. 11, 1966

3,277,681
DUAL KEY RING INCLUDING MAGNETIC FASTENER
Ahmet K. Bey, Chicago, Ill., assignor to Monarch Tool & Machinery Company, Chicago, Ill., a corporation of Illinois
Filed May 11, 1965, Ser. No. 454,790
5 Claims. (Cl. 70—457)

The present invention relates generally to dual key rings and, more particularly, to a dual key ring including an improved magnetic fastener which permits the dual key rings to be easily separated from each other and then fastened firmly together again.

It is the main object of the present invention to provide a dual key ring including an improved magnetic fastener which has a relatively long life compared with locking devices of the prior art, and which is extremely economical and simple to construct.

It is a further object of the invention to provide a dual key ring including a magnetic fastener having a single moving part which is held firmly in a locked position within a very small housing. In this connection, it is an object to provide such a dual key ring in which the magnetic fastener is extremely rugged and compact.

Figure 1:
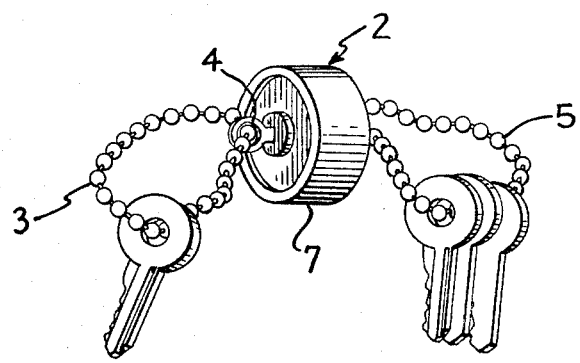
Figure 2:
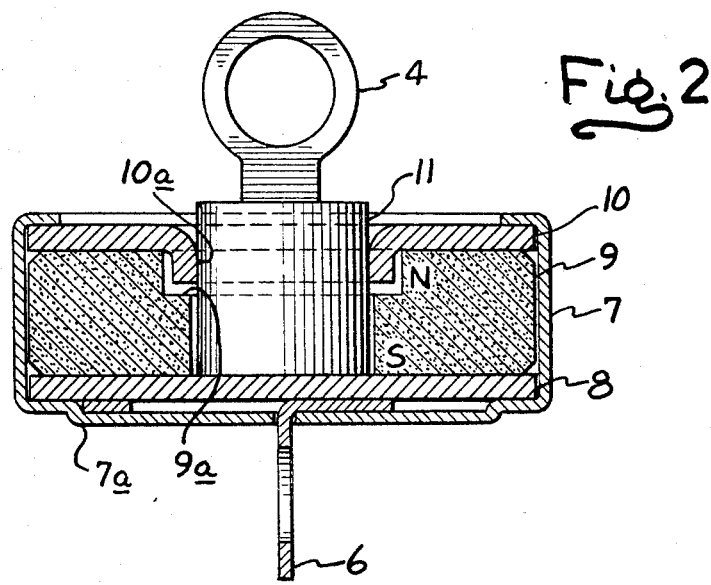

Other objects and advantages of the invention will become apparent upon reading the following description and appended claims and upon reference to the drawings, in which:

FIGURE 1 is a perspective view of a dual key ring including a magnetic fastener embodying the present invention; and FIGURE 2 is a sectional elevation view of the magnetic fastener shown in FIGURE 1 with the two key rings removed therefrom.

While the invention will be described in connection with a preferred embodiment, it is to be understood that the invention is not to be limited to the disclosed embodiment, but on the contrary, it is intended to cover the various modifications and equivalent arrangements included within the spirit and scope of the appended claims.

Turning now to the drawings, in FIGURE 1 there is illustrated a dual key ring including a fastening device 2 with a first key ring 3 attached to an apertured post 4 on one end of the locking device and a second key ring 5 attached to a second apertured post 6 on the other end of the device. The fastening device 2 holds the two key rings 3 and 5 together during ordinary use, but can be unlocked to permit the two rings to be separated from each other. For example, an automobile ignition key might be placed on the one ring 3 and the trunk key on the other ring 5. Then when the automobile is left at a parking lot or garage, for example, the device 2 can be unlocked so that the ring 3 can be left with the automobile while ring 5 is retained by the owner.

In accordance with the present invention, the dual key ring is provided with a magnetic fastener comprising the combination of a non-magnetizable cylindrical housing carryng a first one of the key rings, a magnetizable base plate supported within the housing, a ceramic magnet having two opposed surfaces of opposite polarity and an opening extending through the magnet from one of the opposed surfaces to the other, one of the opposed surfaces engaging a surface of the base plate whereby the base plate is magnetized with a first polarity and one end of the opening is covered by the magnetized base plate, a magnetizable cover plate engaging the other opposed surface of the ceramic magnet whereby the cover plate is magnetized with a second polarity opposite that of the base plate, the cover plate having an opening therethrough aligned with the opening in the ceramic magnet, and a magnetizable locking pin carrying the second key ring, said pin being adapted to slide through the openings in the cover plate and the magnet into abutting engagement with the base plate, the locking pin being magnetized with the second polarity by its sliding engagement with the cover plate, the sliding engagement between the locking member and the cover plate being sufficient to cause the locking member to be magnetically attracted to and held firmly against the base plate.

Thus, the magnetic fastener 2 in the dual key ring illustrated in the drawings includes a non-magnetizable cylindrical housing 7 having a solid bottom wall 7a and an open top. The housing 7 may be made of aluminum, a molded plastic resin, wood, or any other suitable non-magnetic material. An apertured mounting post 6 projects from the bottom wall 7a for mounting one of the key rings 3. The post 6 may be molded or otherwise formed as a part of the housing, or it may be made separately and then attached to the bottom wall 7a of the housing as in the illustrative embodiment shown in FIGURE 2.

Concentrically stacked within the cylindrical housing 7 are a solid magnetizable base plate 8, an annular ceramic magnet 9, and an annular magnetic cover plate 10. The central openings 9a and 10a in the ceramic magnet 9 and the cover plate 10, respectively, are aligned with each other so as to form an axial passageway leading through the cover plate and the magnet and terminating against the solid base plate 8 (see FIGURE 2). The diameters of the base plate 8, the magnet 9, and the cover plate 10 are all only slightly smaller than the inside diameter of the housing 7, and the three stacked members are retained within the housing by a small peripheral flange 7b projecting inwardly from the side wall of the housing. Of course, it will be understood that these members may be retained within the housing by means other than a flange; for example, the three members could be firmly bonded to the sides and bottom walls of the housing. The only moving part in the locking device 2 is a small magnetizable locking member which carries the second key ring 5. In the particular embodiment illustrated, the locking member is in the form of a cylindrical pin 11 which is adapted to fit through the axial passageway formed by the cover plate 10 and the magnet 9 into abutting engagement with the solid base plate 8. It will be recognzed that the opening in the cover plate 10 is somewhat smaller than the opening in the magnet 9 so that the pin 11 is in tight sliding engagement with the cover plate 10 but is spaced a small distance away from the magnet 9.

As illustrated in FIGURE 2, the ceramic magnet 9 is magnetized through its axial thickness so as to provide magnetic poles of opposite polarity at the opposed top and bottom surfaces of the magnet, i.e., the top of the magnet comprises a north pole "N" while the bottom of the magnet comprises a south pole "S." Of course, it will be appreciated that the polarities could be reversed without affecting the operation of the device. Since the base plate 8 and the cover plate 10 are both made of a magnetizable metal, such as soft mild magnetic steel for example, and are in direct engagement with the opposed bottom and top surfaces, respectively, of the magnet 9, it can be seen that the base plate 8 will be magnetized with one polarity and the cover plate 10 will be magnetized with the opposite polarity.

In order to cause the pin 11 to be magnetized with a polarity opposite that of the base plate 8 so that the pin is magnetically attracted to the base plate as the pin is advanced through the axial passageway, it is important that the pin 11 be in tight sliding engagement with the cover plate 10, and in most cases a clearance of 0.002 inch or less is required. In addition, the contact area between the pin 11 and the cover plate 10 is enlarged by providing the plate 10 with a flange 12 which protrudes axially inwardly from the outer periphery of the opening 10a into a complementally formed peripheral groove 9a formed in the magnet 9. The tight sliding engagement between the pin 11 and the cover plate 10 causes the pin 11 to be magnetized with the same polarity as the cover plate 10, which of course is opposite that of the base plate 8. In other words, as far as the magnetic circuit is concerned, the plate 10 and the pin 11 effectively act as a single unit. As a result, the pin 11 is magnetically attracted to the base plate 8 and is held firmly thereagainst by the resulting magnetic forces. This represents the "lock" position of the device.

In order to unlock the device to separate the two key rings 3 and 5, sufficient force must be exerted on the outer end of the pin 11 to overcome the magnetic forces holding the pin to the plate 8, and to withdraw the pin from the axial passageway. However, since a substantial portion of the pin 11 is encased within the axial passageway, it will be appreciated that the unlocking or withdrawing force must be exerted in the direction of the axis of the device in order to be effecttive to unlock the pin. That is, any forces which are accidentally exerted on the pin obliquely or transversely to the axis of the device will not operate to unlock the device. This is obviously a valuable safeguard against accidental unlocking of the pin.

As can be seen in FIGURE 2, the apertured mounting post 4 is connected to the outer end of the movable pin 11 for the purpose of mounting the second key ring 5. As in the case of the post 6, the post 4 may be integral with the pin 11 or it may be formed separately and attached thereto. In operation, when it is desired to separate the two key rings 3 and 5, the pin 11 is removed from the axial passageway along the key ring 3, while the other key ring 5 remains attached to the housing 7.

It will be seen that the aforedescribed preferred embodiment of the locking device of this invention can be made with a total of only five parts, only one of which is movable, and all of which are relatively inexpensive. The movable pin 11 can be easily moved to its locked position in engagement with the base plate 8, but once in that posotion, can be unlocked only by the application of force in a specific predetermined direction, namely, in the direction of the axis of the pin. Moreover, all the non-movable parts are compactly encased within an integral housing, thereby providing a rugged compact unit which is inherently simple and economical to manufacture. Similarly, since the device has no spring members or mechanical latches, it has a long operating life with practically no maintenance. The compactness of the device is largely attributable to the ceramic magnet, which greatly reduces the size of the device over that which would be required for a similar device using other types of magnets. Indeed, in the preferred embodiment of this invention, the axial or longitudinal dimension of the locking device is always smaller than the diameter or transverse dimension of the device.

While various specific forms of the present invention have been illustrated and described herein in some detail, it will be apparent that the same are susceptible of numerous modifications within the spirit and scope of the invention.

I claim as my invention:

1. A dual key ring having two separable key rings comprising the combination of a non-magnetizable cylindrical housing having a solid bottom and an open top, a first key ring attached to the outside of the bottom of said housing, a circular magnetizable base plate disposed within said housing and against the bottom thereof, an annular ceramic magnet having a circular central opening therethrough and being of opposite polarity at opposite ends of said opening, said ceramic magnet being disposed within said housing with one end against said base plate whereby said base plate covers one end of said opening, said base plate being magnetized with a first polarity by its engagement with said magnet, an annular cover plate disposed within said housing against the other end of said magnet, said cover plate having a circular central opening therethrough aligned with the opening in said magnet, said cover plate being magnetized with a second polarity by its engagement with said magnet, and a magnetizable cylindrical pin adapted to fit through the openings in said cover plate and said magnet so as to abuttingly engage said base plate, said pin being in sliding engagement with said cover plate whereby said pin is magnetized with said second polarity, and a second key ring attached to the outer end of said pin whereby said first and second key rings can be attached and separated by the insertion and withdrawal of said pin through said openings.

2. A dual key ring having two separable key rings comprising the combination of a non-magnetizable housing having a solid bottom portion and an open top, a mounting post projecting from the bottom of said housing, a first key ring connected to said mounting post, a magnetizable base plate supported on the inside surface of the bottom of said housing, a ceramic magnet having two opposed surfaces of opposite polarity and an opening extending through said magnet from one of said opposed surfaces to the other, one of said opposed surfaces engaging a surface of said base plate whereby said base plate is magnetized with a first polarity and one end of said opening is covered by said magnetized base plate, a magnetizable cover plate disposed within said housing in bearing engagement with the other opposed surface of said ceramic magnet whereby said cover plate is magnetized with a second polarity opposite the polarity of said base plate, said cover plate having an opening therethrough aligned with the opening in said ceramic magnet, and a magnetizable locking pin adapted to slide through the openings in said cover plate and said ceramic magnet until the end of said pin engages said base plate, the sliding enagement between said locking pin and said cover plate being operable to magnetize said pin with said second polarity whereby said pin is magnetically attracted to said base plate as said pin is advanced through said openings and thereafter magnetically held firmly against said base plate, and a second key ring attached to the outer end of said locking pin whereby said first and second key rings can be attached and separated by the insertion and withdrawal of said pin through said openings.

3. The dual key ring of claim 2 wherein the clearance between said magnetizable locking pin and said magnetizable cover plate is not greater than about 0.002 inch.

4. A dual key ring having two separable key rings comprising the combination of a non-magnetizable cylindrical housing containing a solid magnetizable base plate, an annular ceramic magnet, and an annular magnetizable cover plate concentrically stacked within said housing with the central openings in said annular cover plate and said annular magnet being aligned with each other so as to form an axial passageway leading through said cover plate and magnet and terminating against said solid base plate, a first key ring connected to said housing, a magnetizable locking pin adapted to fit through said axial passageway into abutting engagement with said base plate, said locking pin being in tight sliding engagement with said cover plate, said ceramic magnet being magnetized through its axial thickness so as to provide magnetic poles of opposite polarity at the opposed ends of said opening in said magnet whereby said base plate is magnetized with one polarity and said cover plate and said locking pin are magnetized with the opposite polarity so that said locking pin is magnetically attracted to said base plate as said pin is advanced through said axial passageway, and a second key ring attached to the outer end of said pin whereby said first and second key rings can be attached and separated by the insertion and withdrawal of said pin through said passageway.

5. A dual key ring having two separable key rings comprising the combination of a non-magnetizable cylindrical housing having a solid bottom and an open top, a first key ring attached to the outside of the bottom of said housing, a circular magnetizable base plate disposed within said housing and against the bottom thereof, an annular ceramic magnet having a circular central opening therethrough and being of opposite polarity at opposite ends of said opening, said ceramic magnet being disposed within said housing with one end against said base plate whereby said base plate covers one end of said opening, said base plate being magnetized with a first polarity by its engagement with said magnet, an annular cover plate disposed within said housing against the other end of said magnet, said cover plate having a circular central opening therethrough aligned with the opening in said magnet, said cover plate being magnetized with a second polarity by its engagement with said magnet, a magnetizable cylindrical pin adapted to fit through the openings in said cover plate and said magnet so as to engage said base plate, said pin being in sliding engagement with said cover plate whereby said pin is magnetized with said second polarity, said magnet having a peripheral grove around the end of said opening adjacent said cover plate and said cover plate having a circular flange projecting axially into said groove so that the area of engagement between said cover plate and said cylindrical pin is sufficiently large to cause said pin to be firmly attracted to and held against said base plate, and a second key ring attached to the outer end of said pin whereby said first and second key rings can be attached and separated by the insertion and withdrawal of said pin through said openings.

References Cited by the Examiner
UNITED STATES PATENTS
3,141,216    7/1964    Brett.
FOREIGN PATENTS
914,208    12/1962    Great Britain.

BERNARD A. GELAK, *Primary Examiner.*